United States Patent Office 2,734,473
Patented Feb. 14, 1956

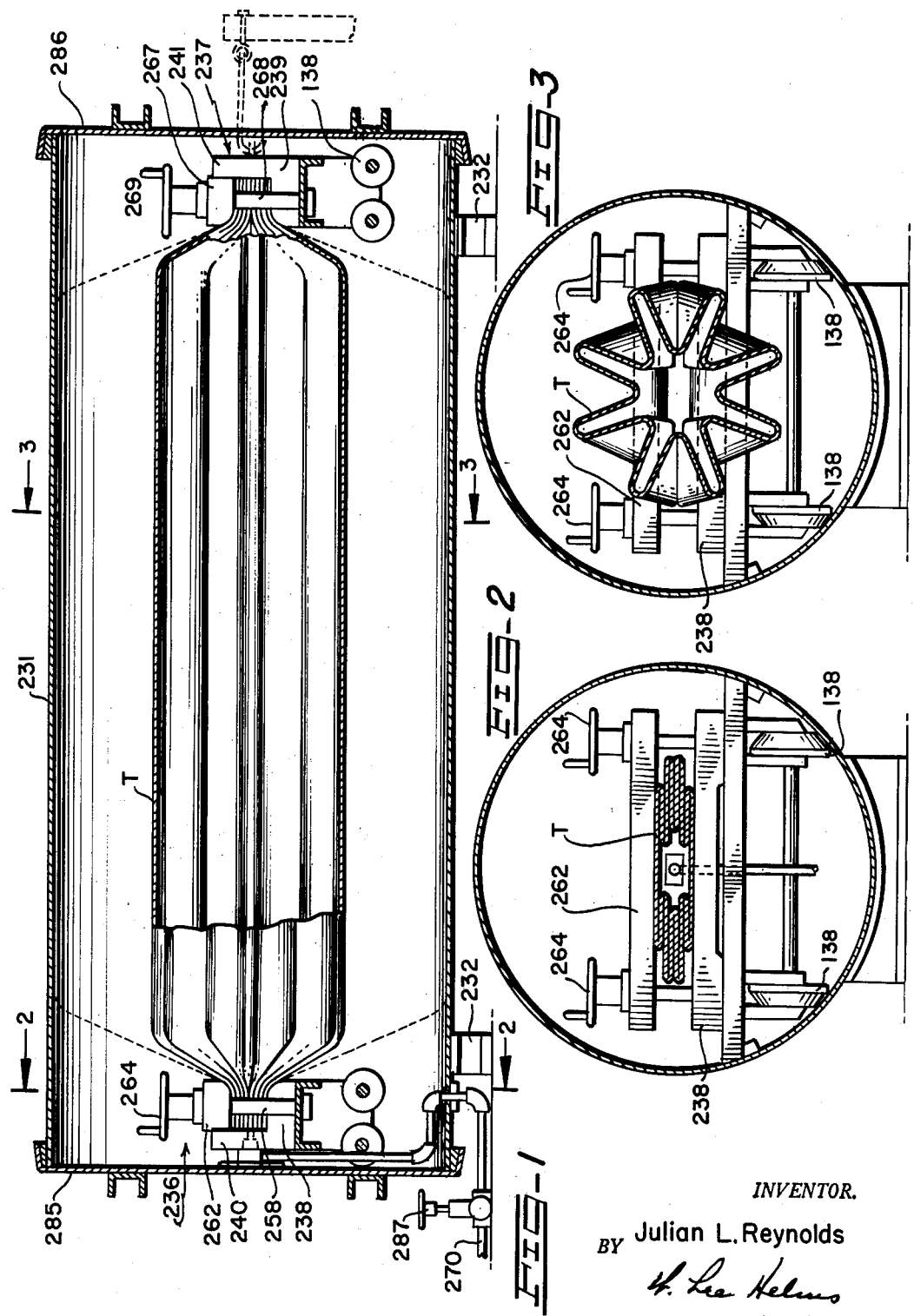

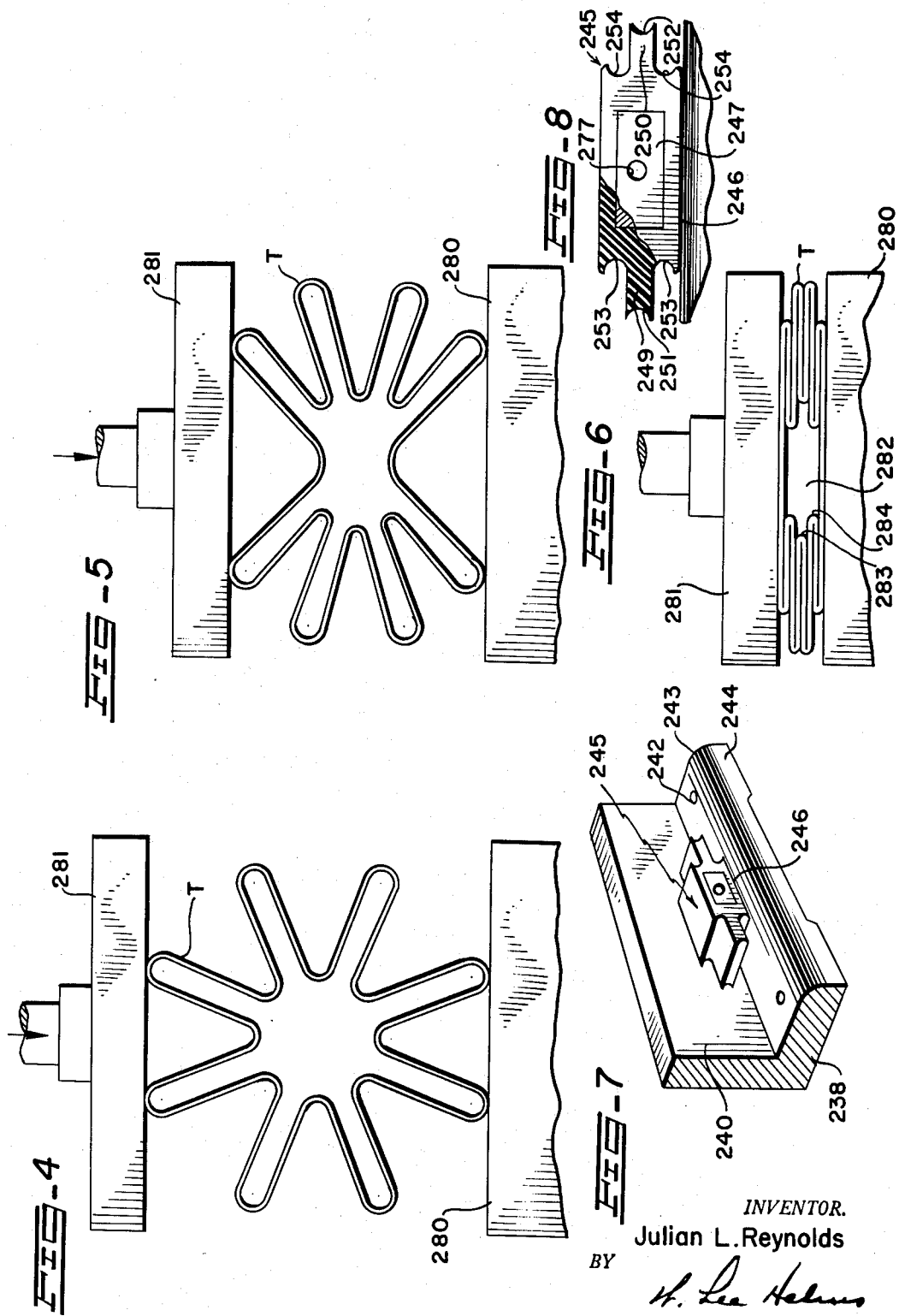

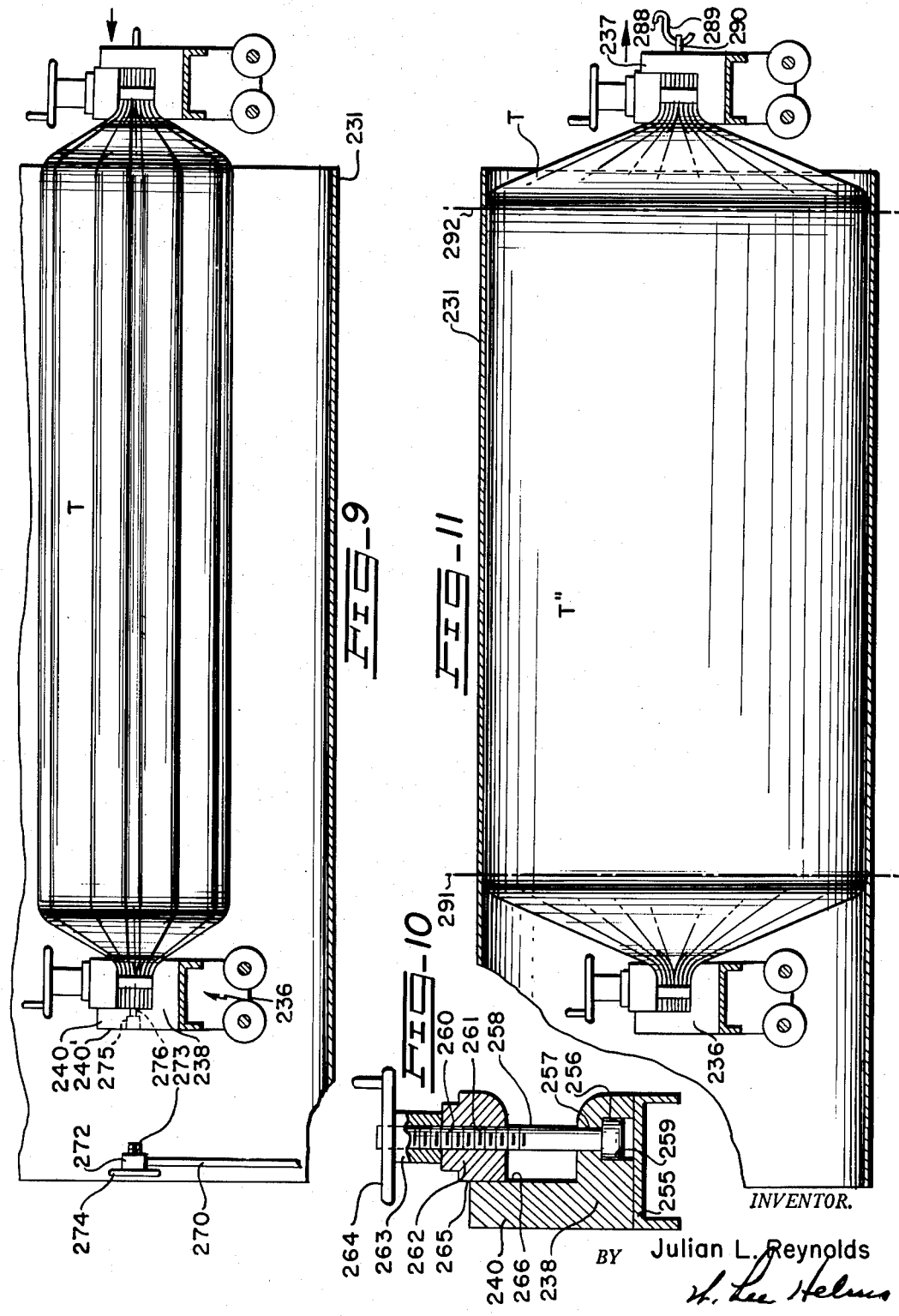

2,734,473
APPARATUS FOR SHAPING TUBES BY FLUID PRESSURE

Julian L. Reynolds, Richmond, Va.

Application November 14, 1950, Serial No. 195,567

2 Claims. (Cl. 113—44)

This invention relates to a method and apparatus for making tubular elements, and more particularly, to the fabrication of metal tanks by first extruding corrugated tubes having a relatively small diameter and then introducing high pressure fluid into the interiors of said corrugated tubes so as to expand them radially into a cylindrical form having a relatively large diameter.

In my copending application Serial No. 189,515, filed October 11, 1950, now Patent No. 2,707,820, issued May 10, 1955, there are disclosed several forms of construction for mountably supporting and for sealing the opposite open ends of the corrugated tube preparatory to introducing fluid under high pressure into the interior of the tube so as to expand the latter into a larger non-corrugated cylindrical shape. The present application is specifically directed to still another form of construction for supporting and sealing the tube ends.

The present invention is particularly advantageous in the manufacture of large-diameter tubular elements by extrusion processes. In conventional methods of extruding metal objects, heated, but solid, metal is forced through the opening of an extrusion die. It will be obvious that the die must have a larger diameter than that of the object which is to be extruded. Although conventional extrusion processes are satisfactory for extruding tubular elements of relatively small diameter, considerable disadvantages arise in the extrusion of very large-diameter tubular elements, the most important disadvantage being the enormous size of the required press and the extrusion die.

Although the present invention is particularly useful when employed in the fabrication of tubular elements having a large diameter, it is to be understood that the fabrication of smaller-diameter tubular and other hollow members may be advantageously provided by the method and apparatus of the subject invention.

It is a primary object of the present invention to provide an apparatus and method for making tubular elements, tanks or other hollow members, wherein a tube having a corrugated wall and open opposite ends is sealed and then a fluid under pressure is introduced into the interior of the corrugated tube so as to expand the latter radially into a cylindrical non-corrugated form of larger diameter.

A further object is to provide a novel means and method for sealing and supportably mounting the opposite ends of the corrugated tube preparatory to introducing high pressure fluid therein so as to expand the tube. In the present form of the invention each of the tube ends is compressed by suitable clamping means so as to be crimped or folded into tight sealing relation around a rigid core.

Another object of the invention is to provide an outer forming chamber having a cylindrical interior die surface against which the wall of the expanding tube abuts so as to be formed into a symmetrical cylindrical form upon the completion of its expansion by the high pressure fluid introduced therein.

A further object is to provide that the clamping means and the core for each tube end be mounted on a carriage reciprocally movable into and out of the interior of the cylindrical die member, whereby a tube may be mounted between the two carriages, the mounting operation being performed at a convenient location exterior of the cylindrical die member, and then the entire assembly of the two carriages with the tube mounted therebetween may be easily moved as a unit into the interior of the cylindrical die member.

A further object of the invention is to provide closure means for the hollow cylindrical forming or die chamber so as to completely enclose the corrugated tube during the expansion step. This enables the temperature and condition of the air within the die chamber and in contact with the tube to be sealed off from the atmosphere and easily controlled.

Still another object of the invention is to provide a novel mounting means for the closure members of the cylindrical forming chamber whereby the closure members may be quickly and easily actuated for opening and closing movements.

Although in the particular embodiment of the invention disclosed herein the extruded corrugated tube is expanded into a cylindrical form having a circular configuration in cross-section, it will be obvious that triangular, rectangular, or other cross-sectional shapes may be obtained by selecting suitable shapes for the extruded tube and the forming chamber or die member. Therefore, the term "cylindrical" as used throughout the specification and claims is intended to include extruded tubes and die members having cross-sections other than circular.

It is to be understood that the particular embodiments of the invention as shown in the drawings and described in the specification are intended to be merely illustrative of several of the many forms which the invention may take in practice and are not to limit the scope of the invention. The latter is delineated in the appended claims.

Other advantages of the present invention are inherent in the apparatus structure and in the method steps as claimed and as disclosed in the specification and in the drawings wherein:

Fig. 1 is a longitudinal vertical sectional view through the apparatus, the corrugated tube being shown within the cylindrical chamber or die;

Fig. 2 is a transverse sectional view taken on the line 2—2 in Fig. 1;

Fig. 3 is a transverse sectional view taken on the line 3—3 in Fig. 1;

Figs. 4, 5 and 6 show the jaws of a conventional press and the successive steps in compressing the tube ends preparatory to mounting the tube ends around and in sealing engagement with a core member;

Fig. 7 is a perspective view showing the lower fixed jaw of one of the clamping means, together with the core to be inserted into one of the compressed tube ends;

Fig. 8 is a detail view of the core with a portion broken away to show the internal construction;

Fig. 9 is a side elevational view of the apparatus with the wall of the cylindrical die broken away and showing the carriage clamping means with the tube ends compressed therebetween being wheeled into the interior of the cylindrical die;

Fig. 10 is a vertical sectional view showing the construction of one of the clamping means for compressing and sealing the tube ends; and Fig. 11 is a longitudinal sectional view similar to Fig. 9 but showing the tube after it has been expanded into contact with the interior surface of the cylindrical die, the clamping means being wheeled to the right in the direction of the arrow so as to remove the expanded tube from the cylindrical die, the heavy dash-dot lines indicating where the crimped ends of the tube are to be cut off from the cylindrical intermediate portion.

In fabricating a tubular element in accordance with the preferred form of the present invention, the first step involves the extrusion of a tube T having a corrugated wall configuration. More specifically, the tube T is extruded so as to have longitudinal flutes or corrugations extending throughout its length. The tube T is also provided with open opposite ends.

After the corrugated tube T has been extruded, it is preferably heated to a suitable hot-working temperature in preparation for the expansion step. However, this heating may be eliminated and the tube may be expanded cold if desired.

Referring now to the drawings, the reference numeral 231 indicates a hollow cylindrical die member horizontally mounted on a pair of supporting means 232. A plurality of wheels 138 are rotatably mounted on a pair of carriages 236, 237 and adapted to ride along the lower interior surface of the die member 231. The carriages 236, 237 are further provided with a fixed lower jaw member 238, 239 respectively, each of the latter being formed with a vertical portion 240, 241.

As shown in Fig. 7, jaw member 238 is provided with a flat planar surface 242 having a rounded forward edge 243 smoothly merging into the vertical face 244. A core member 245 is secured to jaw member 238 with its outermost vertical surface abutting the vertical plane surface of vertical member 240 and its lower surface (not shown) adapted to abut against the horizontal portion 242.

As seen in Fig. 8, the core member 245 comprises a central portion 247 of substantially rectangular cross-section and preferably formed of metal. The outer portion 248 of the core member 245 is preferably made of rubber or other fairly resilient material and comprises two horizontally projecting portions 249, 250 each formed with a concave recess 251, 252. Recesses or grooves 253, 254 are also formed adjacent the projecting portions 249, 250. If the outer portion of the core member is made of resilient material, its lower surface will yield and allow insertion of the corrugated tube wall between said lower surface and the adjacent horizontal jaw surface 242. It will be understood that although it is preferred that the exterior portion 248 of the core member 245 be formed of rubber or other resilient material, the portion 248 may also be made rigid and non-yielding. In the latter case the lower surface of the core member will be spaced a short distance from the jaw surface 242, so as to allow for the insertion of the tube wall. The above described details of construction of jaw member 238 are also present in jaw member 239, only one of the jaw members 238, 239 being shown in detail for purposes of brevity.

As shown in Fig. 10, jaw member 238 is mounted upon an inverted channel member 255 forming part of the carriage 236 and is provided with a cylindrical aperture 256 which communicates with an upwardly-extending cylindrical opening 257. A vertical shaft 258 is provided at its lower end with a head portion 259, rotatably mounted within the aperture 256. The shaft 258 extends upwardly through the vertical opening 257 and its upper portion is provided with an externally-threaded section 260 which is in threaded engagement with an internally threaded opening 261 extending vertically through an upper movable jaw member 262. A collar 263 is secured to the upper portion of the movable jaw member 262.

The upper end of shaft 258 extends freely through the collar 263 and has secured thereto a hand wheel 264. The rear surface 265 of the movable jaw member 262 is planar and is adapted to slide along the planar face 266 of the vertical portion 240 of the fixed jaw member 238. It will be understood that the other carriage 237 is similarly provided with a movable jaw member 267, through which extends a vertical threaded shaft 268 adapted to be rotated by a hand wheel 269. When the shafts 258, 259 are rotated by the hand wheels 264, 269 the movable jaw members 262, 267 are moved vertically toward or away from the fixed lower jaw members 238, 239 for a purpose to be described below.

A pipe line 270 extends through a lower wall portion of the cylindrical member 231, as at 271, and communicates with a connection 272, as best shown in Fig. 9. The connection 272 is hollow and is internally threaded. An externally threaded tubular member 273 is in threaded engagement within the connection 272. The outermost end of the tubular member 273 has a hand wheel 274 secured thereto. By turning the hand wheel 274, the tubular member 273 will be rotated and its threaded engagement with the internally threaded connection 272 will enable it to be moved longitudinally in a direction parallel to the longitudinal axis of the cylindrical die member 231. The vertical portion 240 of the fixed lower jaw member 238 is provided at its rear face 240' with an internally threaded aperture 275 communicating with a channel 276 which in turn communicates with an opening 277 extending through the central portion 247 of the core 245. When the carriage 236 is moved to the left as viewed in Fig. 9, the tubular member 273 may be threaded in to the aperture 275. It will thus be seen that fluid may flow upwardly through the pipe line 270, through the tubular member 273, aperture 275, channel 276, and the opening 277 in the core 245, from which it is introduced into the interior of the corrugated tube.

The operation of the apparatus will now be described. A corrugated or fluted tube T is first formed by a conventional extrusion process. The tube T will have opposite open ends which are then compressed or crimped in the manner shown in Figs. 4 to 6. In these figures the reference numeral 280 indicates a lower fixed jaw of any suitable conventional press, the upper movable jaw being indicated at 281 and provided with suitable means for urging the movable jaw 281 vertically downward toward the fixed lower jaw 280. One of the ends of the corrugated tube T is placed between the jaws 280, 281 of the press when the latter are separated as shown in Fig. 4. The movable jaw 281 is then actuated downwardly so as to compress the flutes or corrugations of the tube T in the manner shown in Fig. 5. At the end of the downward stroke of the jaw 281, the end of the tube T will have become compressed or cramped as shown in Fig. 6 with the flutes or corrugations arranged in a flat overlapping folded relation. The opposite open end of the tube T is then compressed or crimped in the same manner. It will be understood that the resilient nature of the material of the tube T will result in the crimped ends expanding slightly after they have been relieved of the pressure exerted by the jaws 280, 281 upon removal from between the latter.

As noted above, the carriages 236, 237 are movably mounted on wheels 138 whereby they may be wheeled inwardly and outwardly of the interior of the cylindrical die member 231. Before the carriages 236, 237 are moved into the interior of the die member 231, the crimped ends of the tube T are mounted thereon in the following manner. One of the crimped ends of the tube T is placed around core member 245 fixed to the member 241 of the carriage 237. From a comparison of Figs. 6 and 8, it will be obvious that the configuration of the opening 282 in the crimped end of the tube T is similar to that of the core 245, the groove or recess portions 251, 252 receiving the rounded fold portions 283 of the tube T and the rounded fold portions 284 of the latter snugly fitting within the groove or recess portions 253, 254 of the core 245. The upper movable jaw member 262 of the carriage 236 is then moved vertically downwardly by rotating the hand wheels 264 whereby the jaw members 262, 238 will compress the crimped end of the tube therebetween and into tight sealing contact with the core member 245. The other crimped end of the tube T is then similarly mounted with respect to the jaws 239, 267 of the other carriage 237.

The carriages 236, 237 with the tube T mounted therebetween, are then moved as a unit assembly into the interior of the cylindrical member 231 until the aperture 275 in the vertical portion 240 of jaw member 238 engages the threaded tubular member 273. The hand wheel 274 is then rotated so as to thread the tubular member 273 into the internally-threaded aperture 275.

Referring to Fig. 1, the cylindrical die member 231 is provided at its left-hand end with a closure 285 fixedly secured thereto. A second closure 286 is removably mountable on the opposite or right-hand end of the cylindrical die member 231 and is placed thereover after the carriages 236, 237 with the tube T mounted therebetween are wheeled into the interior of the cylindrical die member 231. The valve 287 in the pipe line 270 is then actuated so as to allow high pressure fluid to flow through the pipe line 270 through the connection 272, tubular member 273, channel 276 and the opening 277 in the core 245, thereby filling the interior of the tube T with high pressure fluid so as to expand the latter to the dotted-line position shown in Fig. 1 and also shown in solid lines in Fig. 11.

The interior cylindrical surface of the die member 231 will contact the wall of the expanding tube so as to form the latter into a symmetrical cylindrical shape of considerably larger diameter than the diameter of the corrugated tube T after the extrusion step and before the expansion step. The removable closure 286 is then removed from the right-hand end of the cylindrical die member 231 and the carriages 236, 237 with the expanded tube T mounted therebetween is wheeled outwardly of the interior of the cylindrical die member 231 and to the right as viewed in Fig. 1. This outward movement may be provided by pulling on a cable 288 provided with a hook 289 engaging an eyelet 290 secured to the carriage 237. The crimped opposite ends of the expanded tube T may then be cut off along the heavy dash-dot lines indicated at 291, 292 in Fig. 11 so as to provide a cylindrical tubular product.

What I claim and desire to secure by Letters Patent is as follows:

1. A device for forming cylindrical tubes from corrugated tubes comprising a cylindrical tubular die, a pair of spaced apart movable carriages adapted to suspend a corrugated tube therebetween, mounting means adapted to roll said carriages into said die and engaging said die surface, means retaining said carriages within said die, core members adapted to be disposed in each end of said corrugated tube, at least one of which is apertured, clamping means disposed on each of said carriages adapted to clamp the ends of said tube about said core members to effect a seal pressure tight juncture, and means for introducing high pressure fluid through said apertured core member and into said corrugated tube.

2. The apparatus of claim 1 wherein the carriages are provided with a plurality of spaced apart wheels disposed in pairs on axles, said pairs of wheels being adapted to engage the interior surface of said cylindrical die to suspend said corrugated tube in axial relationship to the axis of said cylindrical die.

References Cited in the file of this patent
UNITED STATES PATENTS

| | | |
|---|---|---|
| 167,688 | Puffer | Sept. 14, 1875 |
| 1,000,574 | Bauroth | Aug. 15, 1911 |
| 1,936,084 | Edwards | Nov. 21, 1933 |
| 2,001,643 | Wilcox | May 14, 1935 |
| 2,086,134 | Ludwick | July 2, 1937 |
| 2,460,820 | Hagapian | Feb. 8, 1949 |
| 2,582,358 | Schoellerman | Jan. 15, 1952 |
| 2,707,820 | Reynolds | May 10, 1955 |